US008799637B2

(12) United States Patent
Hane

(10) Patent No.: US 8,799,637 B2
(45) Date of Patent: Aug. 5, 2014

(54) SYSTEM, METHOD AND SOFTWARE APPLICATION FOR SECURE COMMUNICATION

(75) Inventor: John Hane, Bethesda, MD (US)

(73) Assignee: Xanadoo Company, Berwyn, PA (US)

( * ) Notice: Subject to any disclaimer, the term of this patent is extended or adjusted under 35 U.S.C. 154(b) by 1073 days.

(21) Appl. No.: 10/667,329

(22) Filed: Sep. 23, 2003

(65) Prior Publication Data

US 2004/0133807 A1 Jul. 8, 2004

Related U.S. Application Data

(60) Provisional application No. 60/412,590, filed on Sep. 23, 2002.

(51) Int. Cl.
*H04L 9/00* (2006.01)

(52) U.S. Cl.
USPC ............................................ 713/150; 713/153

(58) Field of Classification Search
USPC ......... 726/28, 29, 30; 713/150, 153; 380/217, 380/278, 42
See application file for complete search history.

(56) References Cited

U.S. PATENT DOCUMENTS

| 4,802,220 | A | * | 1/1989 | Marker, Jr. ....................... 380/33 |
| 5,541,606 | A | | 7/1996 | Lennen |
| 5,822,429 | A | | 10/1998 | Casabona et al. |
| 5,825,887 | A | | 10/1998 | Lennen |
| 5,872,846 | A | * | 2/1999 | Ichikawa ...................... 380/282 |
| 5,894,516 | A | | 4/1999 | Brandenburg |
| 5,982,897 | A | | 11/1999 | Clark |
| 5,995,725 | A | * | 11/1999 | Dillon ........................... 709/203 |
| 6,104,815 | A | | 8/2000 | Alcorn et al. |
| 6,137,885 | A | | 10/2000 | Totaro et al. |
| 6,212,635 | B1 | | 4/2001 | Reardon |
| 6,225,888 | B1 | | 5/2001 | Juopperi |
| 6,229,894 | B1 | | 5/2001 | Van Oorschot et al. |
| 6,240,074 | B1 | | 5/2001 | Chandos et al. |
| 6,289,389 | B1 | * | 9/2001 | Kikinis .......................... 709/239 |
| 6,775,257 | B1 | * | 8/2004 | Watanabe ..................... 370/335 |
| 2001/0054110 | A1 | * | 12/2001 | Kikinis ......................... 709/239 |
| 2002/0052969 | A1 | * | 5/2002 | Fujiwara ...................... 709/231 |
| 2002/0106086 | A1 | * | 8/2002 | Kamiya et al. ................ 380/277 |
| 2002/0166047 | A1 | | 11/2002 | Kawamoto |
| 2002/0174434 | A1 | * | 11/2002 | Lee et al. ........................ 725/74 |
| 2003/0005285 | A1 | | 1/2003 | Graunke |
| 2003/0188188 | A1 | * | 10/2003 | Padmanabhan et al. ....... 713/201 |

OTHER PUBLICATIONS

How PGP works, website <http://www.pgpi.org/doc/pgpintro/>, pp. 1-23.
International Search Report dated Jan. 27, 2004 for Application No. PCT/US03/29814.

* cited by examiner

*Primary Examiner* — Matthew Smithers
(74) *Attorney, Agent, or Firm* — Hunton & Williams LLP

(57) ABSTRACT

The present invention relates generally to systems, methods and software applications for securely transmitting information. More particularly, the present invention relates to providing a system, method and software application for securely transmitting information using multiple transmission methods. An exemplary method of the present invention comprises the steps of: providing data for transmission to a recipient; selecting and addressing a first set of data for transmission to said recipient via a first transmission method, and selecting and addressing a second of data for transmission to said recipient via a second transmission method.

9 Claims, 3 Drawing Sheets

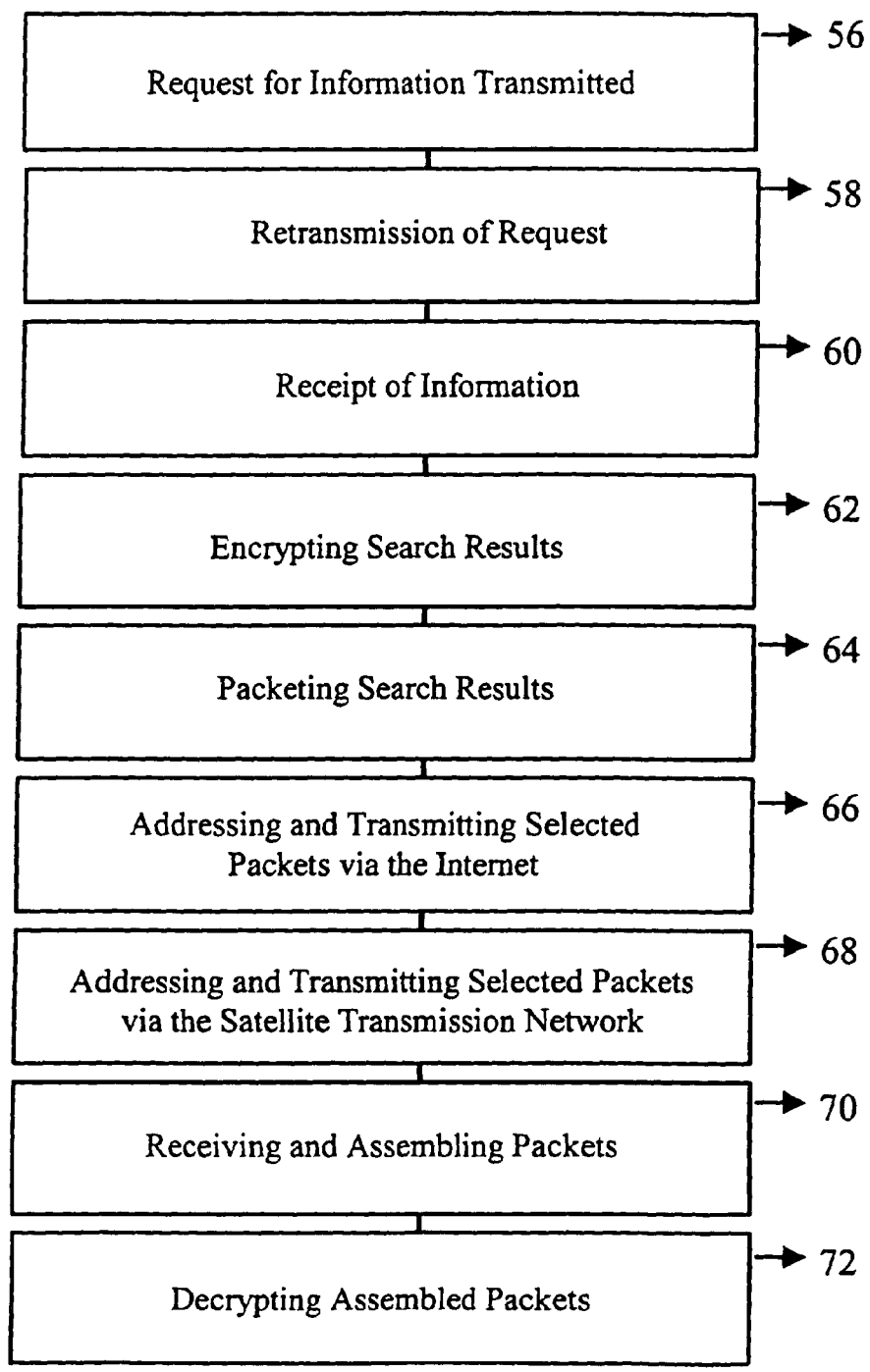

SYSTEM, METHOD AND SOFTWARE APPLICATION FOR SECURE COMMUNICATION

CLAIM TO BENEFIT OF PROVISIONAL APPLICATION

This application claims the benefit of U.S. Provisional Application No. 60/412,590 filed Sep. 23, 2002.

BACKGROUND OF THE INVENTION

The present invention relates generally to a system, method and software application for securely transmitting information. More particularly, the present invention relates to a system, method and software application which allows for the secure transmission of information using multiple transmission methods to enhance security and efficiency.

At present, most Internet network traffic is routed through a public network infrastructure comprised of public and third party routers, servers and switches. This public network, while proficient in transmitting large amounts of data, is notoriously insecure. Anything sent across the Internet can be easily snooped upon. This is of particular concern when highly confidential information, such as corporate data and credit card numbers, are transmitted across the Internet.

For most users, the only protection available for the secure transmission of data over the Internet is encryption which includes using an encryption algorithm and an associated encryption key. In this way, encrypted data is sent to a receiving party who, based on an encryption algorithm and a corresponding decryption algorithm (key), decrypts the encrypted data to recapture the original data. Such encryption systems include software conforming to the widely used Data Encryption Standard ("DES"), which utilizes a symmetric key. Alternatively, such systems may include "public key cryptography," also known as "asymmetric cryptography" in which a public key is used to encrypt messages and a private key is used to decrypt messages. In this system, only the matching private key can be used to retrieve and decrypt messages encrypted by a specific public key.

Regardless of the encryption method used, important limitations and complications arise. One key limitation in using encrypted messages lies in the fact that the messages, however encrypted, still travel across open public networks during transmission. This creates substantial opportunity for the messages to be intercepted and decrypted.

An additional limitation to present encryption systems is that the security of each system rests with the security of the encryption keys themselves. These keys must be protected and secured at all times to ensure the secrecy of the system. This task becomes nearly impossible for very large organizations where employee turnover and attrition is very high. This task is further complicated by the need in most cases to transmit the keys protecting the network traffic by the same public network over which the later encrypted messages will be sent.

Accordingly, there is a strong need for a system which increases the security of data transmitted over the Internet especially for security-minded users.

BRIEF SUMMARY OF THE INVENTION

The present invention overcomes the problems noted above and provides additional advantages, by providing a system, method and software application which enables users to request and securely receive data using multiple transmission paths and methods. In accordance with one embodiment of the present invention, a method for requesting and securely receiving data from the Internet is provided which comprises the steps of: providing data for transmission to a recipient; selecting and addressing a first set of data for transmission to said recipient via a first transmission method, and selecting and addressing a second of data for transmission to said recipient via a second transmission method.

By providing multiple transmission paths and methods in a comprehensive, user friendly manner as provided above, the present invention optimizes the efficiency, and security of the information retrieval process.

Additional advantages of the present invention will be set forth in part in the description which follows, and in part will be obvious from the description, or may be learned by practice of the invention. The advantages of the invention may be realized and attained by means of instrumentalities and combinations, particularly pointed out in the appended claims.

The accompanying drawings, which are incorporated in and constitute a part of this specification, together with the description, serve to further explain the principles of the invention.

BRIEF DESCRIPTION OF THE DRAWINGS

The present invention can be understood more completely by reading the following Detailed Description of exemplary embodiments, in conjunction with the accompanying drawings, in which:

FIG. 3 is a flowchart illustrating the steps in a preferred method for providing secure transmission of data.

DETAILED DESCRIPTION OF THE INVENTION

Figure 1:
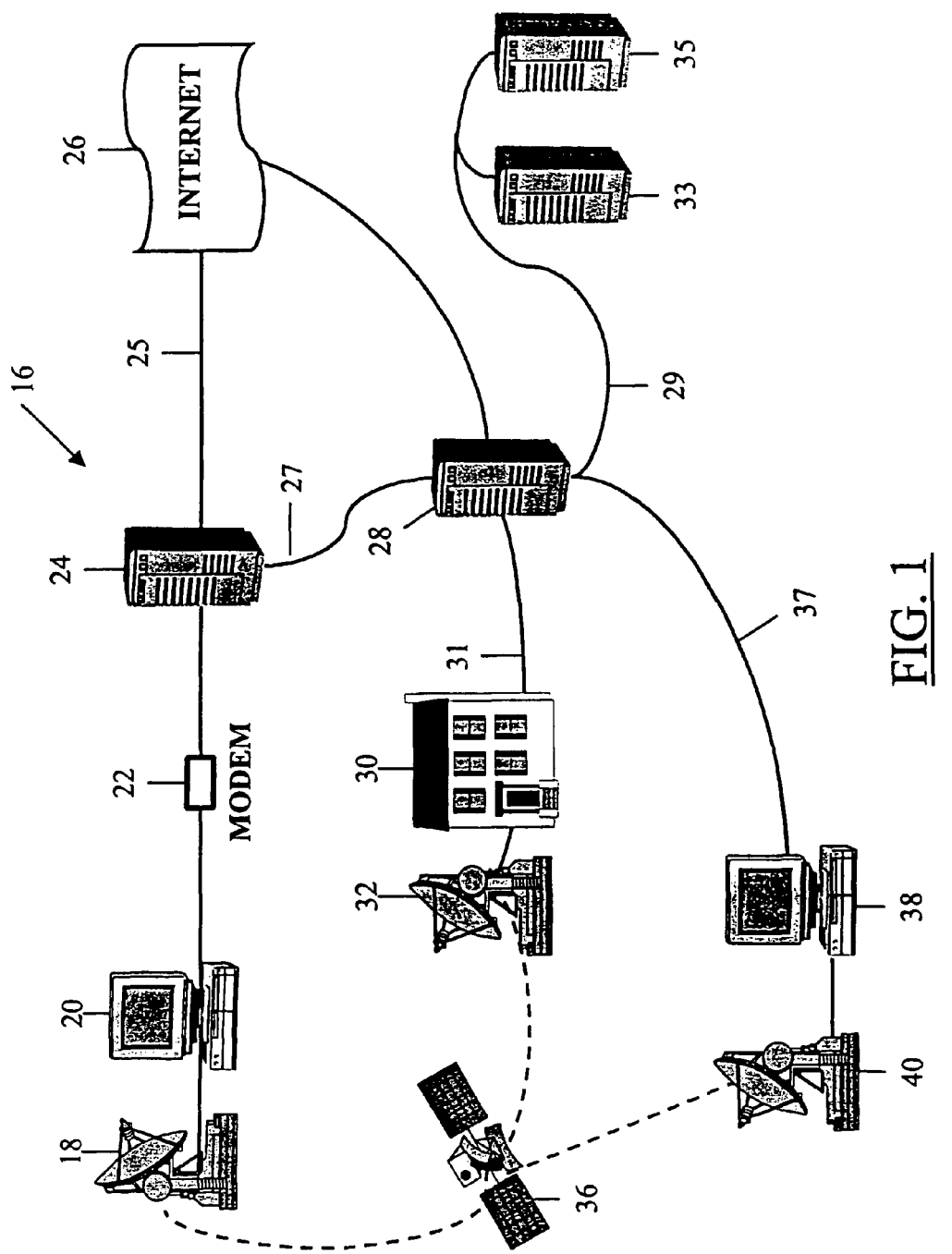
FIG. 1 is a simplified schematic representation illustrating one example of a computer network configuration for use with one embodiment of the present invention.

Reference will now be made in detail to four preferred embodiments of the present invention. Further, a detailed example of a first preferred embodiment is discussed at length and illustrated in the accompanying drawings in which like reference characters refer to corresponding elements. The discussion of the four preferred embodiments, and in particular the first preferred embodiment, is intended purely as an example and should not be read to limit the application and use of the present invention.

Selected functions of the present invention described below, may preferably be implemented by an interactive computer software application incorporated within a computer-readable medium such as a hard disk drive, an optical medium such as a compact disk, or the like. Further, the computer-readable medium may be available to a user either locally on the user's computer or remotely over a computer network, such as a local area network (LAN) or through the Internet. The inventive computer software application is designed to receive retrieved data. The software application then analyzes and segregates the retrieved data into at least a first and second set of data for transmission to a selected recipient. Once segregated, the computer application then causes a first set of data to be transmitted to its recipient via a first data transmission method and further causes a second set of data to be transmitted to the same user via a second data transmission method.

In accordance with a first preferred embodiment, the first set of data may, for example, be transmitted to its recipient via a wired data transmission network (i.e. via ISDN, DSL, WAN, LAN or the like) and the second set of data may be transmitted to the same user via a satellite transmission system.

In accordance with a second preferred embodiment, the first and second sets of data may be transmitted via the Internet wherein the first set of data may be addressed to follow a first transmission path and the second set of data may be addressed to follow a second transmission path. In accordance with this preferred embodiment, the first and second addresses may be automatically attached to the packetized data so that the first and second sets of data appear to potential hackers and packet sniffing software as belonging to two distinct messages.

In accordance with a third preferred embodiment, the first set of data may be transmitted via a first frequency or channel and said second set of data may be transmitted via a second frequency or channel. In accordance with this system, a wireless computer network, such as a network transmitting data via Wi-Fi transmission protocols, may transmit the first set of data on a first Wi-Fi frequency and the second set of data on a second Wi-Fi frequency.

In accordance with a fourth preferred embodiment, the first set of data may be transmitted via a first transmission system at a first time and the second set of data may be transmitted by either the same transmission system or a second transmission system at a later time (i.e. after a selected time delay in the transmission).

Figure 2:
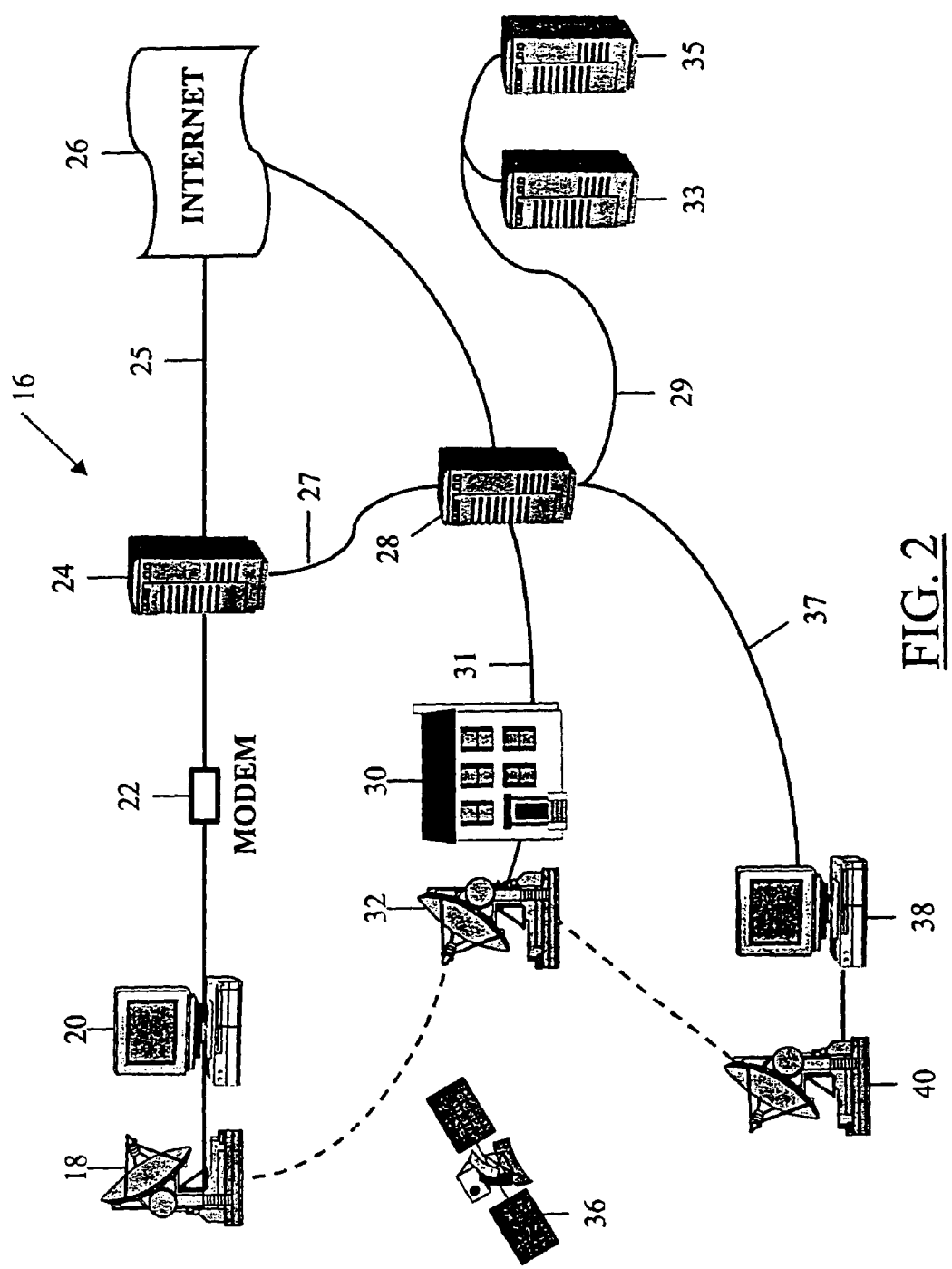
FIG. 2 is a simplified schematic representation illustrating one example of a computer network configuration for use with an alternative preferred embodiment of the present invention.

With reference now to FIGS. 1-3, the first preferred embodiment of the present invention will be further discussed. The satellite transmission system of the first preferred embodiment of the present invention may be part of a multiple purpose satellite communications system. For example, the satellite communications system may provide broadband internet service, television, radio, and/or security communications, without limitation. Further, the satellite communications system may provide interactive or two-way communications, without limitation. The use of satellites to transmit and receive radio signals is well known. Certain frequencies on the electromagnetic spectrum have been dedicated to satellite transmissions, by international agreement. In the case of direct broadcast satellite service ("DBS"), for example, the 1985 Regional Administrative Radio Conference (RARC) of the International Telecommunication Union established the spectrum for DBS at 17.3-17.8 GHz for the uplink and 12.2-12.7 GHz for the downlink in ITU Region 2, the Western Hemisphere. In all, thirty-two frequencies were allotted at each of eight orbital locations set aside for DBS in the United States. Significantly, the RARC also made provisions for the reuse of the satellite-allocated frequencies. See Mead, Donald C., *Direct Broadcast Satellite Communications*, pages 21-22 (2000).

The accompanying Figures illustrate the novel features of the present invention within a simplified and illustrative network configuration. It should be understood that the selected network configuration and example components shown in the accompanying Figures are provided solely as preferred examples of systems which may use the features of the present invention. It should be further understood that the example network and components used are not intended to limit or define the invention in any way. A person of ordinary skill in the art would readily understand, based upon the disclosure herein, that there are numerous ways to implement and/or combine these general categories of the present invention.

Referring now to FIG. 1, an example network arrangement 16 employing the present invention is provided.

As shown in FIG. 1, the example network arrangement 16 comprises a subscriber antenna 18, a subscriber terminal 20, and a modem 22 for accessing a network server 24. In accordance with the present invention, the subscriber antenna 18 may be comprised of a feed, a low-noise amplifier and block converter (LNB), where the signals are amplified and then directed to a processor for demodulation and other processing prior to being directed to a subscriber terminal 20.

As further shown in FIG. 1, the network server 24 may be connected via link 25 to the Internet 26 and via link 27 to a secure network server 28. The network server 24 and the secure network server 28 may be any network, Internet, or enterprise servers capable of hosting or supporting Internet and/or network access. According to a preferred embodiment, these servers 24, 28 may be run using software such as a Netscape Enterprise Server 3.6.2™ application. Alternatively, any network operating system and server software may be used. For instance, the present invention may use programs and operating system applications such as, for example, a Windows™, Unix™, or Macintosh™ operating system. Further in accordance with a preferred embodiment, links 25 and 27 are preferably fixed or wire-line connections. Alternatively, either line 25 and/or 27 may be made via a wireless connection. As shown, secure network server 28 may be further connected to secure servers 33 and 35 and network processing center 30 via links 29 and 31 respectively.

As shown in FIG. 1, network processing center 30 may communicate with multiple subscriber terminals 20, 38 and their operatively associated subscriber 18, 40 via satellite 36. In accordance with a preferred embodiment, such communication may be two way with each subscriber terminal 20, 38 being able to upload and download information to and from the network processing center 30 via satellite 36. As shown in FIG. 2, in an alternative preferred embodiment, subscriber terminals 20, 38 and the network processing center 30 may additionally establish one or two way communications directly via terrestrial signals sent and received directly between operatively associated subscriber antennas 18, 40 and provider antenna 32 without the use of a satellite 36.

In accordance with the present invention, the network processing center 30 may be comprised of a feed, a low-noise amplifier and block converter (LNB), where the signals are amplified and then directed to a processor for demodulation and other processing prior to being directed to an output device for re-transmission.

Referring to FIG. 3, there is shown a flow chart illustrating the steps conducted in a method for requesting and securely receiving data in accordance with one embodiment of the present invention. Referring to step 56, a user may request information from the Internet or a selected private network resource such as a private database. In accordance with the present invention, such a request may be made via a variety of networking links including those based upon, for example, a Network File System (NFS); a Web NFS; a Server Message Block (SMB); a Samba; a Netware Core Protocol (NCP); a Distributed File System (DFS), and a Common Internet File System (CIFS) architecture, as well as use such transport protocols as, for example, TCP/IP, IPX/SPX, HTTP and NetBEUI. In accordance with a preferred embodiment, and with reference to FIG. 1, such a request may be made by subscriber terminal 20 through a modem 22 which may be, for instance, a wireless modem or a wire line modem such as a cable or DSL modem. Alternatively, subscriber terminal 20 may create a link through an ISDN connection or other networking means.

As shown in FIG. 1, a request for information from the Internet may be routed through secure network server 28 which may act as a proxy server for the subscriber terminal 20. Preferably, as shown in FIG. 1, such a request from subscriber terminal 20 may be initially routed through a network server 24 which may be configured as an Internet Service Provider (ISP) for subscriber terminal 20. Alternatively, however, as shown with respect to subscriber terminal 38 via link 37 in FIGS. 1 and 2, each subscriber terminal 20, 28 may be directly linked to secure network server 28 which may itself act as the ISP for the subscriber terminal 20.

With further reference to FIG. 3, in step 58, the subscriber's request for information is retransmitted via the Internet 26. As shown in FIG. 1, each request for information is preferably routed through secure server 28 which executes the search request. Additionally, secure network server 28 may act as a fire wall and may route selected request for secure information to additional secure servers 33, 35 which may provide access to restricted information and databases. In step 60, the data requested is received by the secure network server 28. In step 62, the data is encrypted. In accordance with a preferred embodiment of the present invention, PGP encryption may be used. Alternatively, any desired DES or other encryption method may be used.

In step 64, the encrypted data is packetized. In step 66, selected packets of data are selected and addressed for transmission back to the appropriate subscriber terminal 20 via the Internet and/or network server 24. In step 68, other packets of data are selected and addressed for transmission back to the appropriate subscriber terminal 20 via a satellite transmission network. As shown in FIG. 1, in accordance with a preferred embodiment of the present invention, a satellite transmission network for use with the present invention preferably includes a network processing center 32 with an associated provider antenna 32 for communicating with a satellite 36 and with terrestrially based subscriber antennas 18, 40 and associated subscriber terminals 20, 38. Alternatively, as shown in FIG. 2, in accordance with an alternative preferred embodiment of the present invention, a satellite transmission network for use with the present invention may alternatively include only a network processing center 32 with an associated provider antenna 32 and terrestrially based subscriber antennas 18, 40 and associated subscriber terminals 20, 38. In this alternative preferred embodiment, subscriber terminals 20, 38 and the network processing center 30 preferably establish one or two way communications directly via terrestrial signals sent and received directly between operatively associated provider antennas 18, 40 and the network processing center 30 (via an associated provider antenna 32) without the use of a satellite 36.

In step 70, packets of data from the satellite and Internet transmission paths are received at the target subscriber terminal 20. As shown in FIG. 1 with respect to subscriber terminal 20, the data packets transmitted via satellite transmission are preferably transmitted from network processing center 32 via provider antenna 32 to satellite 36, which then re-transmits the packets to subscriber antenna 18 which receives and routes the packets to the subscriber terminal 20. Further with respect to subscriber terminal 20, the data packets transmitted via the Internet are preferably transmitted from secure server 28 hack to network server 24 and, via modem 22, back to subscriber terminal 20. Alternatively, as shown with respect to subscriber terminal 38, data packets transmitted via the Internet are preferably transmitted from secure server 28 directly back to subscriber terminal 38 via direct link 37.

As is readily apparent from the above detailed description, the system and method of the present invention may be used in a variety of network configurations. The system and method of the invention are also highly flexible and can be easily modified and customized to fit specific situations. For instance, the satellite system of the present invention can provide additional services such as broadband data, single or multi-channel video, and the like, in conjunction with its secure transmission functions. Additionally, the satellite system of the present invention can be used to provide two-way wireless communications.

Additionally, multiple satellites and/or antennas or other relay devices may be incorporated into implementations of the present invention. In this manner, a large number of subscribers may be reached using a satellite system which reuses satellite-allocated frequencies. A person of ordinary skill in the art would understand that it would be possible to vary the arrangements of the provider and subscriber antenna sites and configurations to attain a desired effect.

The low-noise block converters (LNB) of the present invention may be any conventional LNB. The use of LNBs in radio signal antennas is well known and well within the skill of the art. It would be appreciated by persons of ordinary skill in the art that an LNB could be modified for adaptation to the various embodiments of the present invention using readily available techniques and skills without undue experimentation.

The feeds for terrestrial signals and/or satellite signals may be any conventional feeds. The use of such feeds in radio signals receiving equipment is well known and well within the skill of the art. It would be appreciated by persons of ordinary skill in the art that a feed could be modified for adaptation to the various embodiments of the present invention using readily available techniques and skills without undue experimentation.

The subscriber terminals of the present invention may include any conventional processors, including conventional demodulators or other processing devices. The use of a wide variety of processors and demodulators is well known and well within the skill of the art. It would be appreciated by persons of ordinary skill in the art that processors and demodulators could be modified for adaptation to various embodiments of the present invention using readily available techniques and skills, without undue experimentation.

The subscriber terminals of the present invention may also include any communications device or software for providing the subscriber with two-way communications capabilities, such as interactive television, for example, without limitation.

Further, the subscriber terminals of the present invention may be associated with a variety of output devices which may include, for example any television, computer, radio, video recorder/player, or wireless type devices, and the like, or any combination thereof, without limitation. The use of such output devices in combination with radio signal receiving equipment is well known and well within the skill of the art. It would be appreciated by persons of ordinary skill in the art that an output device could be modified for adaptation to the various embodiments of the present invention using readily available techniques and skills without undue experimentation.

For each subscriber terminal, a variety of input devices may be used to allow the subscriber to input and transmit data. For example, the input device may be a channel selector, a computer/keyboard, a remote control device, a set top box, or any combination thereof, without limitation. The input device may include, comprise or be operatively associated with a microprocessor and/or a software module. It would be appreciated by persons of ordinary skill in the art that an input device could be modified for adaptation to the various embodiments of the present invention using readily available techniques and skills without undue experimentation.

For transmitting data in accordance with the present invention, any conventional apparatus for directing and/or processing inputs, including subscriber inputs, preprogrammed responses to received signals or the like, without limitation, may be used. The transmitting apparatus may be operatively associated with the receiving apparatus. Alternatively, the transmitting apparatus may include the receiving apparatus, comprise the receiving apparatus or be entirely independent of the receiving apparatus. It would be appreciated by persons of ordinary skill in the art that a transmitting apparatus could be modified for adaptation to the various embodiments of the present invention using readily available techniques and skills without undue experimentation.

Various receiving and/or transmitting antennas may be incorporated into the systems and methods of the present invention. The present invention contemplates having a single antenna at a subscriber location or provider location capable of receiving signals and/or transmitting signals. Also contemplated by the present invention is the use of separate antennas at the provider location and/or subscriber location for receiving and transmitting satellite signals. Accordingly, each antenna at each provider location and each subscriber location is independently a transmitting antenna, a receiving antenna or both.

For example, the subscriber antenna may be a circular wave guide antenna, feed-horn antenna, flat plate antenna, and/or slot antenna, without limitation. The subscriber antenna is preferably a parabolic reflector with an offset feed to reduce sidelobes and increase directivity in the desired direction. The directional antenna, at the provider location may be any conventional directional antenna. Directional antennas are well known and well within the skill of the art. It would be well within the skill of the art to select and incorporate a directional antenna appropriate for implementing each of the embodiments of the present invention, based upon the guidance provided herein.

Preferably, the directional antenna at the provider location is a high-gain sector antenna. More preferably, the directional antenna is a sectional horn having low sidelobes. Even more preferably, the directional antenna is a high-gain sector antenna. Most preferably, the directional antenna is a high-gain sector antenna designed for low sidelobes in the elevation plane.

The beamwidth (in the azimuthal plane) of the antenna at the provider location is preferably about 120 degrees or less, and more preferably, about 100 degrees. In the vertical plane, the beamwidth of the antenna at the provider site is preferably about 20 degrees or less, and more preferably about 3 degrees.

In accordance with various embodiments and/or implementations of the present invention, it would be understood by persons of ordinary skill in the art that each provider site or subscriber location may have one antenna or a plurality of antennas. Each antenna may be the same or different, in any combination possible. Where one antenna is present at a provider site or a subscriber location, that antenna may both transmit and receive terrestrial signals. Where a plurality of antenna are present at a provider site or subscriber location, one or more of the antennas may transmit terrestrial signals and one or more of the antennas may receive terrestrial signals.

The present system is designed to be capable of co-existing as a secondary service with ubiquitously deployed DBS receivers in the 12.2-12.7 GHz band, according to an implementation of the present invention. The deployment may be national in scope, encompassing urban, suburban and rural areas, with the general design parameters cited herein preferably optimized for each individual site.

In one implementation, the present invention uses methods developed via the FCC NPRM, wherein a "mitigation zone" is defined around an antenna at a provider and/or subscriber within which potentially harmful interference might be received by a DBS antenna. Each DBS receiver within the mitigation zone must then be examined to determine whether harmful interference is actually being received. The FCC proposes a "harmful interference criteria" of 2.86% increase in unavailability for each affected DBS receiver. These parameters establish the interference environment. Generally, line-of-sight conditions will dominate.

In accordance with various embodiments of the present invention, interference is optionally mitigated by utilizing relatively low effective is otropically radiated power (e.i.r.p.) terrestrial transmissions. The e.i.r.p. will generally be set at about the minimum value consistent with the service rules and with the goal of achieving availability of 99.7% at the maximum range, taking rain climatic zones into account. Accordingly, the margin may be as high as about 7 dB in areas of intense rainfall, and as little as 2 dB in regions of less intense rain. Power control may be used where necessary to control interference. Preferably, the directional terrestrial antenna transmits signals at an e.i.r.p. of no greater than about 15 dBW. More preferably, the directional terrestrial antenna transmits signals at an e.i.r.p. of no greater than about 10 dBW. Most preferably, the directional terrestrial antenna transmits signals at an e.i.r.p. of no greater than about 12.5 dBm.

In accordance with an implementation of the invention, satellite-allocated frequencies may be reused for terrestrial service by using relatively narrow beams with tightly controlled sidelobes, angular discrimination, frequency selection, inference mitigation and/or combinations thereof.

The system of the present invention may be used in conjunction with a terrestrial communication system. Optionally, a directional terrestrial antenna at a provider site is positioned such that the antenna has a main access of radiation pointed generally southward. Further, the directional terrestrial antenna is optionally oriented 120 degrees in the azimuthal plane. In addition, the terrestrial antenna optionally has a linear polarization.

Transmitted signals, in accordance with an implementation of the present invention, will have a total bandwidth of about 500 MHz and will be composed of individual signal bandwidths ranging from about 24 MHz to about 500 MHz.

The subscriber antenna for receiving signals in accordance with the present invention optionally includes various receiving characteristics for interference mitigation. For example, the subscriber antenna for receiving terrestrial signals optionally includes an offset-fed reflector. Preferably, the offset-fed reflector about 45 cm to about 60 cm. Further, the offset-fed reflector is optionally linearly polarized.

Interference to satellite signal receivers from transmissions at satellite-allocated frequencies may be mitigated by utilizing adaptive interference cancellers (or "interference cancellers"). In particular, adaptive interference cancellers comprise an auxiliary receiving antenna pointed at a major source of interference. The receiving system of the canceller incorporates an adaptive filter which continuously adjusts its parameters to minimize the interfering signal in the output of the receiver of the satellite signal. Any conventional interference cancellers are contemplated by various embodiments of the present invention, as would be appreciated by persons of ordinary skill in the art. Based upon the guidance provided herein, persons of ordinary skill in the art would readily appreciate the various ways in which interference cancellers could be utilized implement the present invention.

An advantage of the present invention over other secure transmission systems includes the ability to provide, through one service, a secure transmission system, national television programming, regional television programming and local television programming, as well as any other video programming and/or data, including broadband data. Thus, the present invention represents a comprehensive communications system. Moreover, the system, apparatus and method of the present invention may be utilized to provide consumers with traditional data transmission services and Internet services, in addition to single-channel or multi-channel video programming, without limitation. Additionally, the present invention enables at least a full 1 GHz of service to be provided to subscribers. This capability provides a number of benefits, including the ability to use lower power levels, so as to interfere less with satellite signals while maintaining high data rates, as well as a comprehensive communication system, without limitation.

Two-way communication may be provided by the system, apparatus and method of the present invention. The two-way communication provided by the present invention allows subscribers to optionally transmit signals to the service provider, in accordance with various implementations of the present invention. For example, in one implementation of the present invention, a satellite uplink frequency is utilized as a return path for terrestrial service, by having the subscriber antenna at a subscriber location transmit terrestrial signals back to a provider site where it would be received on an antenna and processed by a receiving system. As described above, a terrestrial antenna at a provider site would be aligned in the northward direction.

It will be appreciated by persons or ordinary skill in the art that terrestrial reuse of satellite downlink frequencies relies on the fact that the satellite-based transmitters generally transmit signals from south to north, while the terrestrial transmitters generally transmit from north to south. For example, Interference to and from subscribers using a DBS feeder link hand for a return path would be extremely unlikely for two reasons: there are only two, or at most a few DBS feeder link stations in the United States, and they are located in areas of sparse population. Consequently, the transmissions from those stations would not interfere with the receivers at the transmitting and receiving site of the terrestrial service provider. Similarly, since all of the antennas of the Northern Hemisphere subscribers' low-power return paths would be pointing north, none of them could interfere with the receiver on board a DBS satellite located in the Earth's equatorial plane, even if tuned to the same frequencies. In this manner, various two-way systems may be provided to consumers whereby consumers communicate with the service provider.

It is contemplated that two-way communications services, including television, such as interactive television, and Internet or other data communications service, and the like, without limitation, are optionally provided in accordance with various implementations of the present invention. For example, in one implementation of the invention, a subscriber may request specific programming or data from the provider by requesting the desired programming or data by transmitting signals with the request to the provider. In another implementation of the present invention, for example, the provider, either automatically or by arrangement, receives signals from the subscriber regarding the programming being viewed or data being received to compile information regarding viewership or user-ship for commercial purposes, such as market research. In another implementation of the present invention, for example, the subscriber transmits data to the provider regarding subscribing to the service, extending subscription and/or payment for service. In another implementation, of the present invention, the subscriber is able to engage in transactions by transmitting signals to the provider, for example, without limitation. It would be clear to persons of ordinary skill in the art as to the manner for providing any variations of subscriber interaction in accordance with various embodiments and implementations of the present invention, based upon the guidance provided herein.

In the case of providing Internet service to subscribers in accordance with the present invention, the Internet service is preferably a high-speed broadband service. More preferably, the Internet service is a high-speed broadband service having an information hit rate from about 1.554 MB/s up to about 40 Mb/s per channel. The Internet service and video programming may be combined in any manner, in accordance with various embodiments and implementations of the present invention. For example, the Internet service may be accessed via a television system, without limitation.

The various embodiments of the present invention may further include a portable or wireless communications device, such as a handheld device or a vehicle installed device, without limitation, which contains a transmitter and/or receiver operatively associated with the subscriber location. It would be well within the skill of the art to select the proper components to implement such a system in conjunction with the various embodiments of the present invention described above, based upon the guidance provided herein.

The invention has been described with particular reference to preferred embodiments which are intended to be illustrative rather than restrictive. Alternative embodiments will become apparent to those skilled in the art to which this invention pertains without departing from its spirit and scope. Thus, such variations and modifications of the present invention can be effected within the spirit and scope of the following claims.

What is claimed is:

1. A method for requesting and securely receiving data from the Internet, said method comprising the steps of:
    receiving a request for data;
    collecting data in response to said request;
    packetizing said collected data into at least two sets of data packets, wherein a first set of data packets comprises encrypted data and a second set of data packets comprises a key for decoding said encrypted data;
    selecting and addressing said first set of data packets comprising the encrypted data for transmission at a first transmission time via a first channel in an Internet transmission mode at a first frequency, and automatically attaching a first address to said first set of data packets;
    selecting and addressing said second set of data packets comprising the key for transmission at a second transmission time via a second channel in a satellite transmission mode at a second frequency, wherein the second transmission time is different from the first transmission time and the second frequency is different from the first frequency, wherein the second transmission time is after a selected time delay from the first transmission time;
    transmitting said first set of data packets via said first channel; and
    transmitting said second set of data packets via said second channel.

2. The method of claim 1, wherein the satellite transmission mode is a satellite delivery system comprised of a network processing center with an associated provider antenna and at least one subscriber terminal with an associated subscriber antenna.

3. The method of claim 2, wherein the satellite delivery system further comprises a satellite.

4. A non-transitory computer readable medium executing and storing a software application for enabling requesting and securely receiving data from the Internet, said software application comprising:
- one or more instructions for receiving a request for data;
- one or more instructions for collecting data in response to said request;
- one or more instructions for packetizing said collected data into at least two sets of data packets, wherein a first set of data packets comprises encrypted data and a second set of data packets comprises a key for decoding said encrypted data;
- one or more instructions for selecting and addressing said first set of data packets comprising the encrypted data for transmission at a first transmission time via a first channel in an Internet transmission mode at a first frequency, and automatically attaching a first address to said first set of data packets;
- one or more instructions for selecting and addressing said second set of data packets comprising the key for transmission at a second transmission time via a second channel in a satellite transmission mode at a second frequency, wherein the second transmission time is different from the first transmission time and the second frequency is different from the first frequency, wherein the second transmission time is after a selected time delay from the first transmission time;
- one or more instructions for transmitting said first set of data packets via said first channel; and
- one or more instructions for transmitting said second set of data packets via said second channel.

5. The computer readable medium of claim 4, wherein the satellite transmission mode is a satellite delivery system comprised of a network processing center with an associated provider antenna and at least one subscriber terminal with an associated subscriber antenna.

6. The computer readable medium of claim 5, wherein the satellite delivery system further comprises a satellite.

7. A system for requesting and securely receiving data, said system comprising:
- a first computing element for receiving a request for data;
- a second computing element for collecting data in response to said request; wherein said second computing element packetizes said collected data into at least two sets of data packets, wherein a first set of data packets comprises encrypted data and a second set of data packets comprises a key for decoding said encrypted data;
- a first transmission system for transmitting said first set of data packets comprising the encrypted data from said second computing element to said first computing element at a first transmission time via a first channel in an Internet transmission mode at a first frequency, and automatically attaching a first address to said first set of data packets;
- a second transmission system for transmitting said second set of data packets comprising the key from said second computing element to said first computing element at a second transmission time via a second channel in a satellite transmission mode at a second frequency, wherein the second transmission time is different from the first transmission time and the second frequency is different from the first frequency, wherein the second transmission time is after a selected time delay from the first transmission time.

8. The system of claim 7, wherein the satellite transmission mode is a satellite delivery system comprised of a provider antenna at a provider location for communicating via satellite signals to a subscriber antenna.

9. The system of claim 8, wherein the satellite delivery system further comprises a satellite.

* * * * *